(12) United States Patent
Webb et al.

(10) Patent No.: US 8,425,224 B2
(45) Date of Patent: Apr. 23, 2013

(54) MASS AIR FLOW COMPENSATION FOR BURNER-BASED EXHAUST GAS GENERATION SYSTEM

(75) Inventors: Cynthia C. Webb, San Antonio, TX (US); Jeffrey A. Mathis, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 1587 days.

(21) Appl. No.: 11/376,866

(22) Filed: Mar. 16, 2006

(65) Prior Publication Data

US 2006/0246386 A1 Nov. 2, 2006

Related U.S. Application Data

(60) Provisional application No. 60/662,697, filed on Mar. 17, 2005.

(51) Int. Cl.
*F23N 1/02* (2006.01)

(52) U.S. Cl.
USPC .......... 431/12; 431/18; 431/19; 431/75; 431/89; 123/482; 123/478; 123/488

(58) Field of Classification Search ........... 431/12, 431/18, 19, 75, 89; 123/482, 478, 488
See application file for complete search history.

(56) References Cited

U.S. PATENT DOCUMENTS

| | | | |
|---|---|---|---|
| 1,102,510 A | 7/1914 | Irish | |
| 3,030,773 A | 4/1962 | Johnson | 60/39.65 |
| 3,131,749 A | 5/1964 | Davis | 158/4 |
| 3,176,751 A | 4/1965 | Gerlitz | 158/76 |
| 3,283,502 A | 11/1966 | Lefebvre | 60/39.74 |
| 3,430,443 A | 3/1969 | Richardson et al. | 60/39.65 |
| 3,589,127 A | 6/1971 | Kenworthy et al. | 60/39.65 |
| 3,630,024 A | 12/1971 | Hopkins | 60/39.69 |
| 3,694,135 A | 9/1972 | Dancy et al. | 431/265 |
| 3,758,258 A | 9/1973 | Kölhi | 431/9 |
| 3,859,786 A | 1/1975 | Azelborn et al. | 60/39.65 |
| 3,890,088 A | 6/1975 | Ferri | 431/351 |
| 3,905,751 A | 9/1975 | Hemsath et al. | 431/183 |
| 3,906,718 A | 9/1975 | Wood | 60/39.65 |
| 3,916,619 A | 11/1975 | Masai et al. | 60/39.65 |
| 3,958,413 A | 5/1976 | Cornelius et al. | 60/39.06 |
| 4,035,137 A | 7/1977 | Arand | 431/285 |
| 4,048,964 A * | 9/1977 | Kissel | 123/482 |
| 4,054,028 A | 10/1977 | Kawaguchi | 60/39.23 |
| 4,054,418 A | 10/1977 | Miller et al. | 23/277 |
| 4,118,171 A | 10/1978 | Flanagan et al. | 431/10 |
| 4,270,896 A | 6/1981 | Polinski et al. | 431/328 |
| 4,345,431 A | 8/1982 | Suzuki et al. | 60/286 |
| 4,348,168 A | 9/1982 | Coulon | 431/9 |
| 4,383,411 A | 5/1983 | Riddel | 60/303 |

(Continued)

OTHER PUBLICATIONS

International Search Report and Written Opinion PCT/US06/09541, 7 pages, Jun. 13, 2008.

(Continued)

*Primary Examiner* — Avinash Savani
(74) *Attorney, Agent, or Firm* — Chowdhury & Georgakis PC; Ann C. Livingston

(57) ABSTRACT

A burner-based exhaust gas generation system, having a blower for providing air into the system. The blower is controlled to compensate for variations in mass air flow into the system.

8 Claims, 2 Drawing Sheets

U.S. PATENT DOCUMENTS

| | | | | |
|---|---|---|---|---|
| 4,651,524 | A | 3/1987 | Brighton | 60/274 |
| 4,845,940 | A | 7/1989 | Beer | 60/732 |
| 4,884,555 | A | 12/1989 | Huang | 126/350 |
| 5,002,483 | A | 3/1991 | Becker | 431/352 |
| 5,082,478 | A | 1/1992 | Oono et al. | 55/466 |
| 5,085,577 | A | 2/1992 | Muller | 431/265 |
| 5,140,814 | A | 8/1992 | Kreutmair et al. | 60/303 |
| 5,149,261 | A | 9/1992 | Suwa et al. | 431/207 |
| 5,267,851 | A | 12/1993 | Washam et al. | 431/9 |
| 5,284,116 | A * | 2/1994 | Richeson, Jr. | 123/406.2 |
| 5,320,523 | A | 6/1994 | Stark | 431/353 |
| 5,339,630 | A | 8/1994 | Pettit | 60/303 |
| 5,396,794 | A | 3/1995 | Nichols | 73/118.1 |
| 5,401,162 | A * | 3/1995 | Bonne | 431/12 |
| 5,584,178 | A | 12/1996 | Naegeli et al. | 60/303 |
| 5,590,521 | A | 1/1997 | Schnaibel et al. | 60/274 |
| 5,826,428 | A | 10/1998 | Blaschke | 60/303 |
| 5,860,277 | A | 1/1999 | Schnaibel et al. | 60/274 |
| 5,934,255 | A * | 8/1999 | Dalton et al. | 123/478 |
| 5,997,278 | A * | 12/1999 | Sutton | 431/12 |
| 6,247,310 | B1 * | 6/2001 | Norris et al. | 60/521 |
| 6,247,919 | B1 | 6/2001 | Welz, Jr. et al. | 431/13 |
| 6,301,875 | B1 | 10/2001 | Backlund et al. | 60/39.5 |
| 6,327,889 | B1 | 12/2001 | Seltzer et al. | 73/1.02 |
| 6,378,359 | B1 | 4/2002 | Dobson et al. | 73/118.1 |
| 6,408,834 | B1 * | 6/2002 | Brackney et al. | 123/568.21 |
| 6,490,858 | B2 | 12/2002 | Barrett et al. | 60/280 |
| 6,532,793 | B1 | 3/2003 | Palocz-Andresen | 73/23.31 |
| 6,568,255 | B2 | 5/2003 | Pallozzi | 73/116 |
| 6,586,254 | B1 | 7/2003 | Kumar et al. | 436/7 |
| 6,761,077 | B1 | 7/2004 | Zhu | 73/865.6 |
| 6,823,726 | B1 | 11/2004 | Nagy | 73/117.3 |
| 6,939,127 | B2 * | 9/2005 | Goebel | 431/12 |
| 7,140,874 | B2 * | 11/2006 | Ingalls et al. | 431/185 |
| 7,223,094 | B2 * | 5/2007 | Goebel | 431/12 |
| 7,299,137 | B2 * | 11/2007 | Bartley et al. | 702/34 |
| 2001/0054281 | A1 | 12/2001 | Adams et al. | 60/276 |
| 2002/0170344 | A1 | 11/2002 | Pallozzi | 73/116 |
| 2003/0012700 | A1 | 1/2003 | Carnahan | 422/102 |
| 2003/0079520 | A1 * | 5/2003 | Ingalls et al. | 73/23.31 |
| 2003/0084712 | A1 | 5/2003 | Smith et al. | 73/118.1 |
| 2004/0237636 | A1 | 12/2004 | Bartley et al. | 73/118.1 |
| 2007/0157606 | A1 * | 7/2007 | Schenck Zu Schweinsberg | 60/285 |

OTHER PUBLICATIONS

International Preliminary Report on Patentability; PCT/US2006/009541, Mar. 19, 2009.

Bykowski, Bruce B., et al.; "Advanced Procedures and Analytical Tools for Meeting SULEV Standards"; Eighth Coordinating Research Council (CRC) On-Road Vehicle Emissions Workshop, vol. 2; San Diego, California; Apr. 1998.

M.N. Ingalls, et al.; "FOCAS—A New Apparatus for Evaluating the Effects of Poisoning on Catalyst Durability," Eighth CRC On-Road Vehicle Emissions Workshop, vol. 2; San Diego, California; Apr. 1998.

SAE International, "Automotive Systems Testing Toptec", Oct. 14-15, 1998, Novi, Michigan (SAE Presentation).

Southwest Research Institute, "Fuel/Oil Catalyst Aging System (FOCAS)", 1999.

Preliminary Report on Patentability, PCT/US05/28468, 7 pages, Mailed on Jun. 21, 2006.

McCullough et al., An Experimental Evaluation of the Oil Fouling Effects of Two-Stroke Oxidation Catalysts, Society of Automotive Engineers, Inc., pp. 29-40, 1998.

Weisweiler et al., Simulation of a Driving Cycle in Laboratory: An Approach for Testing Catalysts Suitable for Automotive Exhaust $NO_x$ Abatement Under Lean Conditions, Chemical Engineering and Processing 37, pp. 229-232, 1998.

* cited by examiner

MASS AIR FLOW COMPENSATION FOR BURNER-BASED EXHAUST GAS GENERATION SYSTEM

CROSS-REFERENCE TO RELATED APPLICATIONS

This application claims the benefit of U.S. Provisional Application No. 60/662,697 filed on Mar. 17, 2005, entitled "Mass Air Flow Compensation for Burner-Based Exhaust Gas Generation System", which is incorporated herein by reference in its entirety.

TECHNICAL FIELD OF THE INVENTION

This invention relates generally to systems and methods for simulating exhaust conditions produced by an internal combustion engine, and more particularly to reducing variations in the air flow into a burner-based engine exhaust simulation system.

BACKGROUND OF THE INVENTION

As a result of recent regulatory initiatives, motor vehicle emissions aftertreatment devices are required to have longer useful lives. For example, in the 1990's, the United States Environmental Protection Agency (EPA) increased the mileage for which automotive emission control elements must function from 50,000 to 100,000 vehicle miles. This requirement places severe demands on emissions control devices as they age. As one example of the deleterious effects of aging, various exhaust gas components can "poison" a catalytic type emissions treatment device over time.

To understand the effects of aging of emissions control devices, it is necessary to have a test system and procedure that will permit the evaluation of the long term effects of individual variables that may affect the performance of the device.

Historically, "engine-based" test systems, which receive emissions from actual internal combustion engines have been used for such evaluations. However, engine-based systems can be inconsistent, maintenance intensive, and expensive to operate. In addition, engine-based systems do not conveniently permit the separate evaluation of individual variables, such as the effects of fuel and oil constituents. Also, in engine-based systems, engine oil consumption varies with engine age, operating temperature, speed and other variables, which are all difficult to control.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a mass air flow (MAF) compensation system and method, for use with a burner-based exhaust gas generator. Mass air flow data may be acquired and used by a system control unit to control the flow of air into the system.

Overview of Burner-Based Exhaust Gas Generation System

Figure 1:
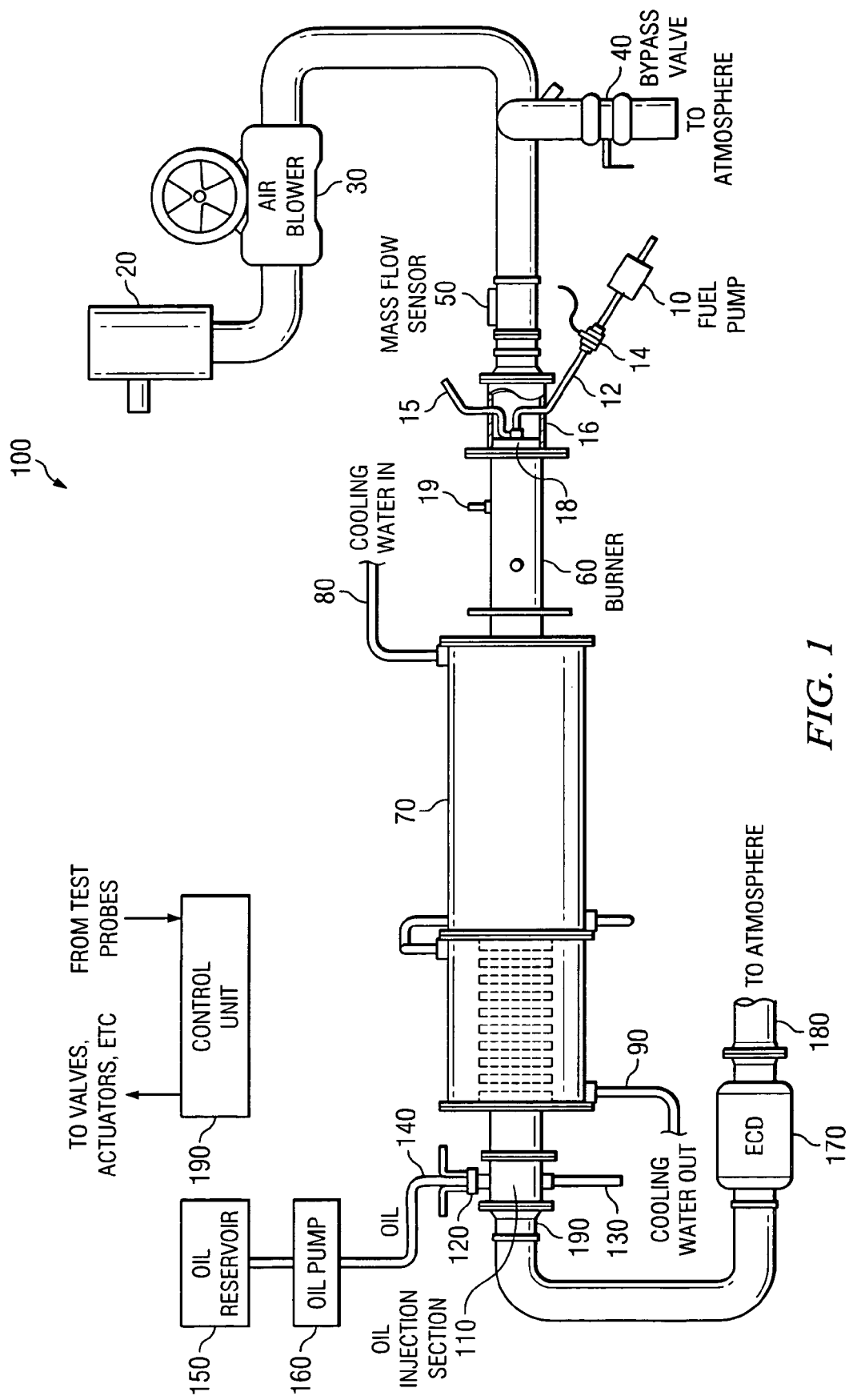
FIG. 1 illustrates an example of a burner-based exhaust generation system with which the invention may be used.

FIG. 1 illustrates a burner-based exhaust gas generation system 100. System 100 is an example of a system with which the invention (described in connection with FIGS. 2 and 3) may be used.

System 100 may be used to simulate the production of exhaust gas by an internal combustion engine. For example, system 100 may be used to simulate the production of exhaust gas by a motor vehicle engine.

A typical use of system 100 is for aging an emissions control device (ECD) 170, such as those installed in the exhaust system of an engine. System 100 may be used accurately produces the effects of heat, additives, contaminants, and other effects of use on the efficiency of the emissions control device.

System 100 is especially suitable for aging an emissions control device over simulated extended driving conditions. The aged device can then be performance tested on an actual vehicle, or otherwise evaluated.

System 100 provides exhaust from combustion of any one of various types of fuels for internal combustion engines. Examples of such fuels are gasoline, synthetic gasoline, diesel, liquefied fuel produced from coal, peat or similar materials, methanol, compressed natural gas, or liquefied petroleum gas. The exhaust is provided with a specified air-to-fuel ratio. A separate oil atomization system permits isolation of the effects of fuel and of lubricant at various consumption rates and states of oxidation.

System 100 is capable of operating over a variety of conditions. It may simulate various modes of engine operation, such as cold start, steady state stoichiometric, lean, rich, and cyclic perturbation.

Further details of a test system, like that of system 100 and with which the invention may be used, are described in U.S. patent application Ser. No. 10/213,890, entitled "Method and Apparatus for Testing Catalytic Converter Durability", to Ingalls, et al., assigned to Southwest Research Institute, and incorporated by reference herein.

The main subsystems of system 100 are: (1) an air supply system to provide air for combustion to the burner, (2) a fuel system to provide fuel to the burner, (3) a burner system to combust the air and fuel mixture and provide the proper exhaust gas constituents, (4) a heat exchanger to control the exhaust gas temperature, (5) an oil injection system, and (6) a computerized control system.

In the example of FIG. 1, these subsystems are configured in series along a flow line. At the point of installation of the ECD, the flow line simulates an exhaust tail pipe. Although not shown in FIG. 1, secondary air may be injected into the flow line, for example, at a point between the heat exchanger and the ECD.

The air supply system has an air blower 30, which draws ambient air through an inlet air filter 20 and exhausts a pressurized stream of air. The volume of air supplied is set by adjusting a bypass valve 40 to produce a desired flow rate of air, which is measured by a mass flow (MAF) sensor 50.

Air blower 30 and MAF sensor 50 may be of any design, including conventional designs known to persons of ordinary skill in the art. An example of a suitable blower 30 is an electric centrifugal blower, such as a Fuji Electric Model VFC404A Ring Blower. An example of a suitable MAF sensor 50 is an automotive inlet air flow sensor such as a Bosh Model Number 0280214001 available from most retail automotive parts stores.

The fuel supply system has a fuel pump 10, which pumps automotive fuel via fuel line 12 through fuel control valve 14, and eventually to burner 60. Although various types of control valves may be used, an example of a suitable fuel control valve 14 is a solenoid valve. Valve 14 receives a signal from control unit 190 and regulates the flow of fuel to burner 60.

Valve 14 may be of a design which will operate with a pulse modulated signal. An example of a suitable control valve 14 is a Bosch frequency valve model number 0280 150 306-850 available from most retail automotive parts suppliers. From valve 14, the fuel is delivered to a fuel injector 16 associated with burner 60. An air assist line 15 may be used to provide high pressure air for atomization of the fuel.

Burner 60 combusts fuel in the presence of air. An example of a suitable burner 60 is a swirl-stabilized burner capable of producing continuous stoichiometric combustion of automotive fuel.

Burner 60 comprises a plenum chamber and a combustion tube. A swirl plate 18 separates the plenum chamber from the combustion tube. The air and fuel are separately introduced into the burner 60. Air is delivered to the plenum chamber, then through the swirl plate 18 into the burner tube.

Swirl plate 18 is equipped with a fuel injector 16. The mixture of gas and air are combusted with the aid of at least one spark igniter 19, which may be placed through the wall of the combustion tube of burner 60. An example of a suitable spark igniter 19 is a spark plug.

Heat exchanger 70 receives the exhaust from burner 60. Heat exchanger 70 may be of any conventional design known persons of ordinary skill in the art. In the example of FIG. 1, heat exchanger 70 is a gas-to-liquid heat exchanger, but air-to-air devices could also be used.

In the example of FIG. 1, heat exchanger 70 has two sections. An upstream section consists of a water jacketed tube. A downstream section is a vertical cross flow shell and tube heat exchanger. The vertical cross flow design minimizes steam formation and steam trapping within the cooling tubes. Heat exchanger 70 has an inlet water line 80 and an outlet water line 90, which supply and drain water to cool the exhaust gas to a desired temperature. For ECD testing, this temperature simulates the temperature present at the inlet to the ECD 170 in a specified motor vehicle.

The oil injection section 110 is downstream the exhaust line from burner 60. In the example of FIG. 1, it is also downstream from heat exchanger 70. Oil injection section 110 provides an optional atomized oil spray comprising oil droplets with a sufficiently small diameter to vaporize and oxidize the oil before it reaches the catalyst. In operation, a sample of oil is withdrawn from an oil reservoir 150 by means of an oil pump 160. Various types of pumps may be used, such as a peristaltic type pump. Pump 160 delivers oil from the reservoir through an oil injection line 140 and into a water cooled probe 120 from which the oil is injected into the exhaust gas in the oil injection section 110.

Control unit 190 provides a means to control operating parameters of system 100, such as ignition, air assist to the fuel injector, auxiliary air, fuel feed, blower air feed, and oil injection. An example of a suitable control unit 190 is a processor-based system having hardware and software appropriate for the data acquisition, processing, and control signal generation described herein. The level of sophistication of control unit 190 may vary from simple embedded controller type devices to computers with sophisticated user interface programming.

Control unit 190 is in communication with various test probes (not shown), which collect data regarding a number of parameters associated with system 100. Example parameters are: the mass air flow in the system, the air/fuel ratio (linear and EGO), the exhaust gas temperature at the outlet from the heat exchanger, the exhaust gas temperature at the inlet to the ECD, and the exhaust gas temperature at the outlet from the ECD. The information measured by the test probes is transmitted by electronic signals to control unit 190.

Control unit 190 is capable of controlling a number of parameters associated with system 100, using various valves and actuators. Examples of control output parameters are power to the blowers and fuel pump, activation of fuel injectors, burner spark, oil injection, and auxiliary air.

In operation, control unit 190 receives signals representing system temperatures, mass air flow for the burner air, and the burner air to fuel ratio. These measurements are converted to data, and the measured data is the basis for calculating operating conditions such as total exhaust flow and burner air to fuel ratio. Output parameters are determined by the engine being simulated.

The burner air-to-fuel ratio (AFR) may be controlled as either open or closed loop, maintaining either specified fuel flow or specified AFR. AFR control may be achieved by varying the rate of fuel delivered to the burner.

It should be understood that the system of FIG. 1 is but one example of an exhaust gas simulation system with which the invention may be used. In general, the invention is useful with any burner-based exhaust gas simulation system that uses a blower or other forced air device to supply combustion air.

System 100 may or may not be used for testing emissions control devices—in practice it may be used to test any device affected by an engine exhaust system or it may simply be used to produce exhaust gas. In systems, such as the example of FIG. 1, in which system 100 is used for testing one or more emissions control devices, system 100 is equipped with at least one "insertion point" so that these devices may be conveniently installed and removed at will.

Mass Air Flow Compensation

In a system such as system 100, the exhaust gas flow rate, along with other parameters (such as temperature) are specified. For various testing procedures, these parameters must be maintained and allowed variations are limited. Moreover, where system 100 is used for testing ECDs, these parameters may have different values during various aging cycles, with constraints on rates of change and steady state time durations.

One parameter for controlling the exhaust flow rate is the mass air flow (MAF) as measured by sensor 50. A problem to be overcome is that variations in air density due to diurnal or weather related changes in pressure and humidity conditions can cause variations in the mass of air delivered to burner 60. In addition to making it difficult to meet the specification on exhaust mass flowrate, MAF variations result in variations in burner-out temperature. Burner-out temperature variations can result in temperature variations at the ECD, and thereby diminish the reliability and repeatability of the aging procedure.

As explained below, system 100 can be modified to reduce MAF variations.

Figure 2:
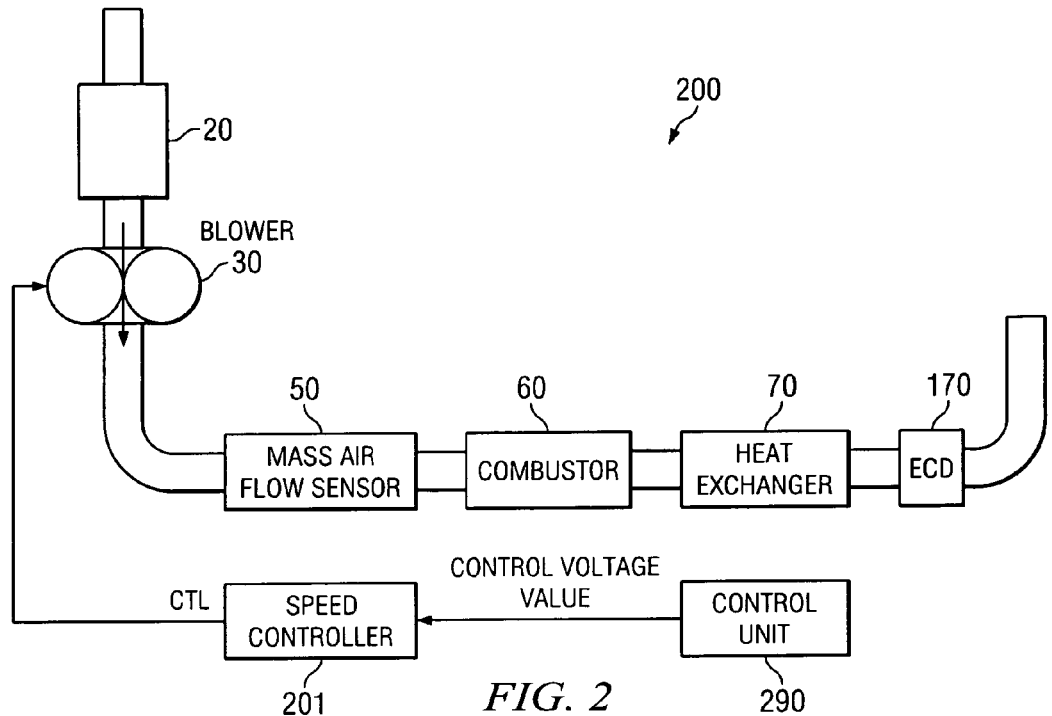
FIG. 2 illustrates how the system of FIG. 1 may be modified to implement mass air flow compensation in accordance with the invention.

FIG. 2 illustrates a modified burner-based exhaust gas generation system 200, which reduces MAF variations in accordance with the invention. System 200 is a simplified system as compared to the system of FIG. 1, but is otherwise comparable. Various features of system 100, as described above, may be incorporated into system 200.

In the example of FIG. 2, the forced air device 30 is a fixed displacement blower at the beginning the main flow line. As explained above, changes in air density can result in variations in MAF from blower 30. The invention is useful with blower 30, as well as with other electronically controlled devices for supplying forced air. Various fans and turbocharging devices may be used as alternatives to blower 30, and may be placed at various points along the flow line upstream or downstream burner 60, to push or pull air through the main flow line.

MAF compensation is achieved by using a speed controller 201 to vary the blower speed to maintain a desired setpoint. Control unit 290 receives MAF data from MAF sensor 50, monitors air consumption during specified modes of operation of burner 60, and delivers a control voltage to speed controller 201.

Control unit 290 is programmed to carry out the blower speed control tasks described below in connection with FIG. 3. Control unit 290 may be integrated with other control tasks described above in connection with a system control unit, such as control unit 190 of FIG. 1.

Figure 3:
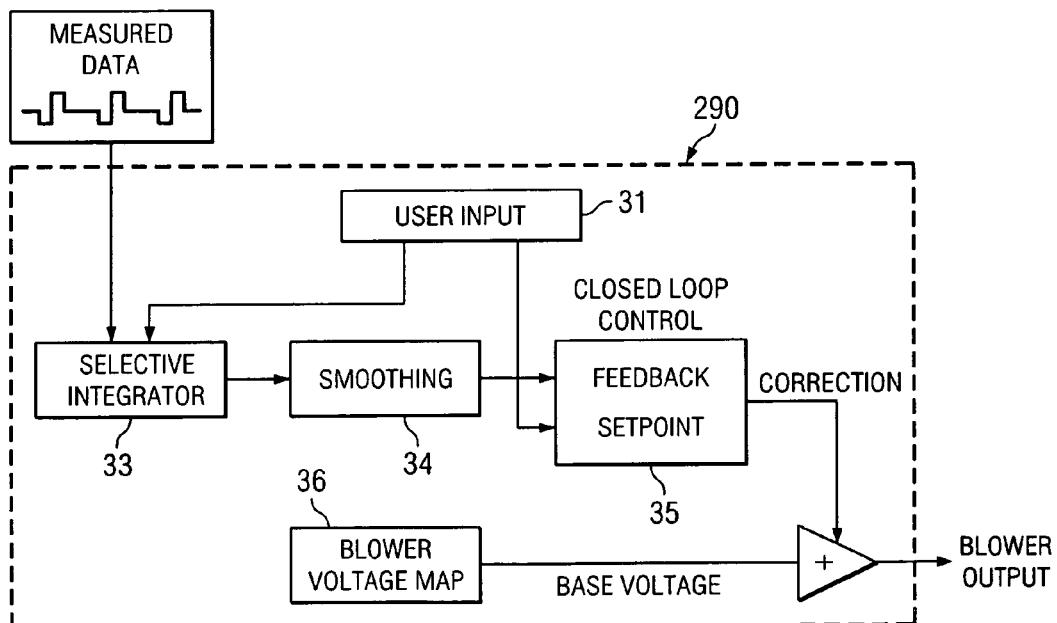
FIG. 3 illustrates a method of controlling mass air flow in accordance with the invention.

FIG. 3 schematically illustrates the control concept, as implemented by appropriate programming for control unit 290. Control unit 290 may be implemented with various types of hardware, firmware, and/or software devices known in the art of electronic controls. The control scheme implemented by control unit 290 is described below in terms of process steps, such as might be implemented with processor and/or logic devices.

Control unit 290 receives data representing an operator-specified mode of operation, or more specifically, data that represents characteristics of a targeted operating condition (Step 31). An example of input to control unit 290 is an aging cycle, with specified MAF values to be achieved at specified times during the aging cycle. At any given time during the aging cycle, a desired MAF is referred to as the "setpoint MAF".

Control unit 290 also receives measured MAF values (Step 32), which it integrates (Step 33) and optionally smoothes (Step 34). An example of a suitable smoothing algorithm is a moving average.

Control unit 190 then uses the filtered MAF as input into a closed loop process. The closed loop process uses the feedback value and the setpoint value to provides a correction value (Step 35). A base voltage value, which has been stored in memory (Step 36) is adjusted with the correction value, resulting in an output voltage that controls blower speed.

In addition to diurnal variations, mass air flow (measured and setpoint) can vary throughout an aging cycle as a result of the different operating modes within the cycle. In Step 31, different setpoints at different times may be provided in the form of a stored program. The user might specify a desired aging cycle, as opposed to specific setpoint values.

For example, a cycle may consist of: numerous MAF and AFR (air/fuel ratio) setpoints, secondary air injection (resulting backpressure can reduce MAF), numerous AFR setpoints (MAF can vary slightly with AFR—typically due to backpressure effects). Aging cycle data is received by integration process 33, which sifts through the cycle, and accumulates and monitors the MAF during selected modes of operation.

In other embodiments, MAF sensor 50 could be placed at other points along the flow line. In general, the invention may be used to monitor flow rate at any point along the flow line, whether upstream or downstream of burner 60, and to adjust the output of the forced air device, such as blower 30.

What is claimed is:

1. A burner-based system for generating exhaust gas that simulates exhaust gas from an internal combustion engine and for delivering the exhaust gas to an emissions control device for testing of the emissions control device in accordance with a predetermined aging cycle having a specified exhaust flow rate and extending over at least one diurnal time period, comprising:
   a main flow line;
   a forced air device for forcing air along the main flow line and having an output control mechanism;
   a burner downstream the forced air device;
   a fuel injector for delivering fuel to the burner located downstream from the burner, the injector having an atomizing fuel sprayer;
   wherein the burner combusts a mixture of air and fuel, thereby providing exhaust gas; a sensor for measuring the mass air flow within the flow line;
   a heat exchanger for controlling the temperature of exhaust gas delivered to the emissions control device;
   a control unit in communication with various test probes, the test probes measuring system temperatures, mass air flow for the burner, and air to fuel ratio for the burner, the control unit controls parameters based on measurements from the probe to control ignition, air assist to fuel injection, fuel feed, and blower air;
   the control unit programmed to store at least one mass air flow rate setpoint and to perform the following tasks: receiving mass air flow data from the sensor, using the mass air flow data to generate a correction voltage value, using the correction value to generate a voltage output signal delivered to the output control mechanism of the forced air device.

2. The system of claim 1, wherein the forced air device is a blower.

3. The system of claim 1, wherein the sensor is a mass air flow sensor.

4. The system of claim 1, wherein the sensor is placed between the forced air device and the burner.

5. A method of using a burner-based exhaust gas generation system to provide a exhaust to an emissions control device for the purposes of testing the emissions control device in accordance with a predetermined aging cycle that has a specified exhaust flow rate and extends over at least one diurnal time period, comprising:
   determining a mass air flow setpoint that will result in the specified exhaust flow rate; using a forced air device to force input air into a main flow line, the forced air device having an output control mechanism;
   using a burner downstream the forced air device to receive the air and fuel, and to combust a mixture of the air and fuel, thereby providing exhaust gas;
   using a mass air flow sensor to measure the mass air flow along the flow line;
   using a heat exchanger to control the temperature of exhaust gas delivered to the emissions control device;
   providing a control unit in communication various test probes;
   using the probe for measuring system temperatures, mass air flow from the burner, and air to fuel ration of the burner;
   controlling ignition, air assist to fuel injection, auxiliary air, fuel feed, blower air feed and oil injection based on measurements from the probe
   using a control unit to store at least one mass air flow rate setpoint and to perform the following tasks: receiving mass air flow data from the mass air flow sensor, using the mass air flow data to generate a correction voltage value, using the correction value to generate a voltage output signal delivered to the output control mechanism of the forced air device.

6. The method of claim 5, wherein the forced air device is a blower.

7. The method of claim 5, wherein the measuring step is performed with a mass air flow sensor.

8. The method of claim 5, wherein the measuring step is performed by sensing the flow between the forced air device and the burner.

* * * * *